United States Patent
Van Dyke et al.

(10) Patent No.: US 9,507,919 B2
(45) Date of Patent: Nov. 29, 2016

(54) RIGHTS MANAGEMENT SYSTEM FOR STREAMED MULTIMEDIA CONTENT

(75) Inventors: Clifford P. Van Dyke, Bellevue, WA (US); David J. Cheng, Cupertino, CA (US); Siva Mohan, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1888 days.

(21) Appl. No.: 11/113,216

(22) Filed: Apr. 22, 2005

(65) Prior Publication Data

US 2006/0242080 A1 Oct. 26, 2006

(51) Int. Cl.
G06Q 99/00 (2006.01)
G06F 21/10 (2013.01)
G06Q 20/12 (2012.01)
G06F 21/00 (2013.01)

(52) U.S. Cl.
CPC ........... *G06F 21/10* (2013.01); *G06F 21/00* (2013.01); *G06Q 20/1235* (2013.01); *H04N 2201/3246* (2013.01)

(58) Field of Classification Search
CPC ............... G06Q 20/1235; H04N 2201/3246; G06F 21/00
USPC ...................................... 705/50, 59; 380/255
See application file for complete search history.

(56) References Cited

U.S. PATENT DOCUMENTS

| | | | |
|---|---|---|---|
| 3,718,906 A | 2/1973 | Lightner | 340/147 R |
| 4,323,921 A | 4/1982 | Guillou | 358/114 |
| 4,528,643 A | 7/1985 | Freeny, Jr. | 364/900 |
| 4,658,093 A | 4/1987 | Hellman | 380/25 |
| 4,683,553 A | 7/1987 | Mollier | 380/4 |
| 4,827,508 A | 5/1989 | Shear | 380/4 |
| 4,916,738 A | 4/1990 | Chandra et al. | 380/25 |
| 4,926,479 A | 5/1990 | Goldwasser et al. | 380/23 |
| 4,953,209 A | 8/1990 | Ryder, Sr. et al. | 380/23 |

(Continued)

FOREIGN PATENT DOCUMENTS

| | | | |
|---|---|---|---|
| EP | 0 715 246 B1 | 6/1996 | |
| EP | 0 715 247 B1 | 6/1996 | |

(Continued)

OTHER PUBLICATIONS

"Aladdin Knowledge Systems Partners with Rights Exchange, Inc. to Develop a Comprehensive Solution for Electronic Software Distribution," Aug. 3, 1988, 5 pages.

(Continued)

*Primary Examiner* — James D Nigh
(74) *Attorney, Agent, or Firm* — Sunah Lee; Dan Choi; Micky Minhas

(57) ABSTRACT

To communicate requirements for a digital license from a receiver of corresponding digital content to a computing device upon which the digital content is to be rendered, the receiver tunes the content and locates within the content information relating to the requirements for the license, constructs the requirements from the located information, and sends such constructed requirements to the computing device. The computing device upon receiving the sent requirements constructs the license based on such received requirements, stores such constructed license in a license store of such computing device, and thereafter renders the content only in accordance with the license. Thus, the receiver need not communicate the license itself to the computing device.

21 Claims, 9 Drawing Sheets

| INPUT COPY PROTECTION METHOD |
| ROBUST? |
| COPY DEFAULT? |
| REDISTRIBUTION-CONTROLLED? |
| CONSTRAINED IMAGE? |
| APS REQUIREMENTS |
| COPY CONTROL VALUE |
| RESERVED |

(56) References Cited

U.S. PATENT DOCUMENTS

| | | | | |
|---|---|---|---|---|
| 4,977,594 | A | 12/1990 | Shear | 380/4 |
| 5,050,213 | A | 9/1991 | Shear | 380/25 |
| 5,103,392 | A | 4/1992 | Mori | 395/725 |
| 5,103,476 | A | 4/1992 | Waite et al. | 380/4 |
| 5,109,413 | A | 4/1992 | Comerford et al. | 380/4 |
| 5,117,457 | A | 5/1992 | Comerford et al. | 380/3 |
| 5,193,573 | A | 3/1993 | Chronister | 137/315 |
| 5,222,134 | A | 6/1993 | Waite et al. | 380/4 |
| 5,261,002 | A | 11/1993 | Perlman et al. | 380/30 |
| 5,319,705 | A | 6/1994 | Halter et al. | 380/4 |
| 5,410,598 | A | 4/1995 | Shear | 380/4 |
| 5,473,692 | A | 12/1995 | Davis | 380/25 |
| 5,490,216 | A | 2/1996 | Richardson, III | 380/4 |
| 5,509,070 | A | 4/1996 | Schull | 380/4 |
| 5,629,980 | A | 5/1997 | Stefik et al. | 380/4 |
| 5,634,012 | A | 5/1997 | Stefik et al. | 395/239 |
| 5,638,443 | A | 6/1997 | Stefik et al. | 380/4 |
| 5,673,316 | A | 9/1997 | Auerbach et al. | 380/4 |
| 5,710,887 | A | 1/1998 | Chelliah et al. | 395/226 |
| 5,715,403 | A | 2/1998 | Stefik | 395/244 |
| 5,765,152 | A | 6/1998 | Erickson | 707/9 |
| 5,809,144 | A | 9/1998 | Sirbu et al. | 380/25 |
| 5,845,281 | A | 12/1998 | Benson et al. | 707/9 |
| 5,892,900 | A | 4/1999 | Ginter et al. | 395/186 |
| 5,917,912 | A | 6/1999 | Ginter et al. | 380/24 |
| 5,953,420 | A | 9/1999 | Matyas, Jr. et al. | 380/21 |
| 6,073,124 | A | 6/2000 | Krishnan et al. | 705/59 |
| 6,078,909 | A | 6/2000 | Knutson | 705/59 |
| 6,094,487 | A | 7/2000 | Butler et al. | 380/270 |
| 6,118,873 | A * | 9/2000 | Lotspiech et al. | 380/277 |
| 6,189,146 | B1 | 2/2001 | Misra et al. | 717/11 |
| 6,219,652 | B1 | 4/2001 | Carter et al. | 705/59 |
| 6,226,618 | B1 | 5/2001 | Downs et al. | 705/1 |
| 6,233,567 | B1 | 5/2001 | Cohen | 705/59 |
| 6,289,452 | B1 | 9/2001 | Arnold et al. | 713/175 |
| 6,330,670 | B1 | 12/2001 | England et al. | 713/2 |
| 6,343,280 | B2 | 1/2002 | Clark | 705/55 |
| 6,574,609 | B1 * | 6/2003 | Downs | G06F 21/10 380/255 |
| 6,574,612 | B1 | 6/2003 | Baratti et al. | 705/59 |
| 6,587,837 | B1 * | 7/2003 | Spagna et al. | 705/52 |
| 6,681,017 | B1 | 1/2004 | Matias et al. | 380/277 |
| 6,757,913 | B2 * | 6/2004 | Knox | 725/153 |
| 6,804,824 | B1 * | 10/2004 | Potrebic | H04N 21/8549 348/732 |
| 6,832,319 | B1 | 12/2004 | Bell et al. | 713/193 |
| 7,065,787 | B2 * | 6/2006 | Ganesan et al. | 726/21 |
| 7,093,295 | B1 * | 8/2006 | Saito | 726/26 |
| 7,096,203 | B2 * | 8/2006 | Pence et al. | 705/59 |
| 7,184,550 | B2 * | 2/2007 | Graunke | 380/42 |
| 7,281,273 | B2 * | 10/2007 | Strom | G06F 21/10 705/59 |
| 7,581,255 | B2 * | 8/2009 | Alkove et al. | 726/26 |
| 7,602,913 | B2 * | 10/2009 | Wasilewski | G11B 20/00086 380/228 |
| 2001/0051037 | A1 * | 12/2001 | Safadi et al. | 386/83 |
| 2001/0052077 | A1 | 12/2001 | Fung et al. | 713/184 |
| 2001/0056539 | A1 | 12/2001 | Pavlin et al. | 713/193 |
| 2002/0013772 | A1 | 1/2002 | Peinado | 705/51 |
| 2002/0116641 | A1 * | 8/2002 | Mastrianni | G06Q 10/107 726/11 |
| 2003/0115069 | A1 | 6/2003 | Pence et al. | |
| 2003/0194094 | A1 | 10/2003 | Lampson et al. | 380/282 |
| 2003/0217011 | A1 | 11/2003 | Peinado et al. | |
| 2004/0003274 | A1 * | 1/2004 | Strom | G06F 21/10 713/193 |
| 2004/0181490 | A1 | 9/2004 | Gordon et al. | |
| 2005/0091672 | A1 * | 4/2005 | Debique | G06F 8/20 719/328 |
| 2005/0154921 | A1 * | 7/2005 | Medvinsky | G06F 21/10 726/4 |
| 2005/0198159 | A1 * | 9/2005 | Kirsch | H04L 51/12 709/206 |
| 2005/0216951 | A1 * | 9/2005 | MacInnis | H04N 5/4401 725/135 |
| 2005/0262022 | A1 * | 11/2005 | Oliveira | G06F 21/10 705/51 |
| 2006/0235800 | A1 * | 10/2006 | Furlong | G06F 21/105 705/59 |
| 2006/0239451 | A1 * | 10/2006 | Evans | G06F 21/10 380/44 |
| 2006/0242078 | A1 * | 10/2006 | Evans | G06Q 10/06 705/59 |
| 2006/0242079 | A1 * | 10/2006 | Evans | H04N 7/165 705/59 |
| 2006/0242080 | A1 * | 10/2006 | Van Dyke | G06F 21/10 705/59 |
| 2006/0277257 | A1 * | 12/2006 | Kromann | H04L 12/583 709/206 |
| 2006/0280301 | A1 * | 12/2006 | Oliveira | H04N 7/1675 380/212 |
| 2009/0119578 | A1 * | 5/2009 | Relyea | G06F 9/4443 715/234 |
| 2009/0202079 | A1 * | 8/2009 | Puputti et al. | 380/279 |

FOREIGN PATENT DOCUMENTS

| | | | |
|---|---|---|---|
| WO | WO 93/01550 | A1 | 1/1993 |
| WO | WO 96/13013 | A1 | 5/1996 |
| WO | WO 96/24092 | A3 | 8/1996 |
| WO | WO 96/27155 | A2 | 9/1996 |
| WO | WO 97/25798 | A1 | 7/1997 |
| WO | WO 97/43761 | A2 | 11/1997 |
| WO | WO 98/09209 | A1 | 3/1998 |
| WO | WO 98/10381 | A1 | 3/1998 |
| WO | WO 98/21679 | A1 | 5/1998 |
| WO | WO 98/24037 | A1 | 6/1998 |
| WO | WO 98/37481 | A1 | 8/1998 |
| WO | WO 00/15221 | A1 | 3/2000 |
| WO | WO 00/58811 | A3 | 10/2000 |
| WO | WO 00/59150 | A2 | 10/2000 |

OTHER PUBLICATIONS

Armati, D., "Tools and standards for protection, control and presentation of data," Apr. 3, 1996, 17 pages.

Benjamin, R. et al., "Electronic markets and virtual value chains on the information superhighway," *Sloan Management Rev.*, Winter, 1995, 62-72.

Cassidy, "A Web developers guide to content encapsulation technology," Apr. 1997, 5 pages.

Cox, B., "Superdistribution," *Idees Fortes*, Sep. 1994, 2 pages.

Cox, B., "What if There Is a Silver Bullet," *J. Object Oriented Programm.*, Jun. 1992, 8-9 and 76.

Griswold, G.N., "A Method for Protecting Copyright on Networks," *IMA Intell. Property Project Proceedings*, Jan. 1994, 1(1), 169-178.

Hauser, R.C., "Does licensing require new access control techniques?" Aug. 1993, 9 pages.

Hudgins-Bonafield, C. "Selling Knowledge on the Net," *Network Computing*, Jun. 1, 1995, 102-109.

"IBM spearheading intellectual property protection technology for information on the Internet," May 1996, 3 pages.

"Technological Solutions Rise to Complement Law's Small Stick Guarding Electronic Works," *Information Law Alert*, Jun. 16, 1995, 3-4 and 7.

Kaplan, M.A., "IBM Cryptolopes_, Super-Distribution and Digital Rights Management," Dec. 1996, 7 pages.

Kent, S.T., "Protecting externally supplied software in small computers," Sep. 1980, 1-42 and 250-252.

Kohl, U. et al., "Safeguarding Digital Library Contents and Users; Protecting Documents Rather Than Channels," *D-Lib Magazine*, Sep. 1997, 9 pages.

Linn, R.J., "Copyright and Information Services in the Context of the National Research and Education Network," *IMA Intell. Property Project Proceedings*, Jan. 1994, 1(1), 1 and 10-20.

McNab, L., "Super-distribution works better in practical applications," Mar. 2, 1998, 2 pages.

Moeller, M., "NetTrust lets Cyberspace Merchants Take Account," *PC Week*, Nov. 20, 1995, 12(48), 1 page.

(56) References Cited

OTHER PUBLICATIONS

Moeller, M., "IBM takes charge of E-commerce; Plans client, server apps based on SET," Apr. 1996, 4 pages.
Pemberton, J., "An ONLINE Interview with Jeff Crigler at IBM InfoMarket," Jul. 1996, 6 pages.
"LicensIt: kinder, gentler copyright? Copyright management system links content, authorship information," *Seybold Report on Desktop Publishing*, 1996, 10(11), 2 pages.
Sibert, O. et al., "The DigiBox: A Self-protecting Container for Information Commerce," *First USENIX Workshop on Electronic Commerce*, Jul. 11-12, 1995, 171-183.
Sibert, O. et al., "Securing the Content, Not the Wire, for Information Commerce," Jul. 1995, 1-11.
Stefik, M., "Trusted Systems," Mar. 1997, 8 pages.
Stefik, M., "Shifting the Possible: How Trusted Systems and Digital Property Rights Challenge Us to Rethink Digital Publishing," *Technical Perspective*, 1997, 137-159.
"Rights Management in the Digital Age: Trading in Bits, Not Atoms," Spring, 1997, 4, 3 pages.
Weber, R., "Digital Right Management Technology," Oct. 1995, 35 pages.
White, S.R. et al., "ABYSS: An Architecture for Software Protection," *IEEE Trans. on Software Engineering*, Jun. 1990, 16(6), 619-629.
White, S.R. et al., "ABYSS: A trusted architecture for software protection," *IEEE. Symposium on Security and Privacy*, Apr. 27-29, 1987, 38-51.
Ramanujapuram, A. et al., "Digital Content & Intellectual Property Rights: A specification language and tools for rights management," Dec. 1998, 20-23 and 26.
Unknown, Optimising license checkouts from a floating license server, *ARM the Architecture for the Digital World*, http://www.arm.com/support/faqdev/1391.html.
Craig, W., et al., "Digital licensing," *IEEE Internet Computing*, 2005, 9(4).
Olson, M., et al., "Concurrent access licensing," *UNIX Review*, 1988, 6(9), 67-72 (from Dialog Accession No. 01254918).
Unknown, Finland—Data fellows secures ICSA certification, *Newsbytes*, 1998; ' (from DialogClassic Web(TM), File 9, Accession No. 01451058, 2 pages).
Unknown, "Black box crypton defies the hackers," *Electronic Weekly*, 1985, 1257, p. 26 (from DialogClassic Web™ file 275, Accession No. 01116377).
Unknown, "Solution for piracy," *Which Computer*, 1983, p. 29 (from DialogClassic Web™ file 275, Accession No. 01014280).
From PR Newswire, "Sony develops copyright protection solutions for digital music content," 1999, http://www.findarticles.com.
From http://www.findarticles.com, "BreakerTech joins copyright management market," *Computer International*, 1999.
Kahn, R.E, "Deposit, Registration and Recordation in an electronic copyright management system," *IMA Intellectual Property Project Proceedings*, 1994, 1(1), 111-120.
"Aladdin acquires the assets of Micro Macro Technologies," *Business Wire*, 1999 http://www.findarticles.com.
"Office Action Issued for Canada Patent Application No. 2601809", Mailed Date: Jul. 15, 2014, Filed Date: Mar. 16, 2006, 2 Pages.
"Office Action Received for Canada Patent Application No. 2601809", Mailed Date: Nov. 25, 2013, Filed Date: Mar. 16, 2006, 4 Pages.

* cited by examiner

RIGHTS MANAGEMENT SYSTEM FOR STREAMED MULTIMEDIA CONTENT

CROSS-REFERENCE TO RELATED APPLICATIONS

The present application shares a common disclosure with:

U.S. patent application Ser. No. 11/112,325, and entitled "Rights Management System for Streamed Multimedia Content", U.S. patent application Ser. No. 11/113,215, and entitled "Rights Management System for Streamed Multimedia Content", and U.S. patent application Ser. No. 11/113,160, and entitled "Rights Management System for Streamed Multimedia Content", all of which are filed concurrently, and all of which are hereby incorporated by reference in their entirety.

TECHNICAL FIELD

The present invention relates to a rights management (RM) system whereby access to streamed digital content is provided only in accordance with a corresponding digital license. More particularly, the invention relates to systems and methods employed by such an RM system for handling the streamed content.

BACKGROUND OF THE INVENTION

Rights management (RM) and enforcement is highly desirable in connection with digital content such as digital audio, digital video, digital text, digital data, digital multimedia, etc., where such digital content is to be distributed to one or more users. Digital content could be static, such as a text document, for example, or it could be streamed, such as the streamed audio and video of a multimedia presentation. Typical modes of distribution of such streamed content include tangible and intangible forms such as an optical disk, a cable-access feed, a feed from an electronic network such as the Internet, a feed from an over-the-air broadcast, etc. Upon being received by a user at an appropriate computing device thereof, such user renders the streamed digital content with the aid of the computing device, appropriate rendering software, and appropriate output devices such as speakers, a video monitor, etc.

In one scenario, the streamed content is distributed by a distributor as part of a subscription service, such as for example a digital television service, and the streamed content as distributed is either protected, such as for example by being encrypted, or is unprotected. If it is the case that the streamed content is indeed distributed in an unprotected form, it may be the case that the distributor primarily intends for the streamed content to be immediately consumed and rendered, and not stored in any meaningful retrievable form. For example, the streamed content may be one of many streams of content in a digital cable television signal that is to be received by a digital cable set-top box and immediately rendered thereby, and is then to be forwarded to the aforementioned appropriate output devices.

However, it is to be appreciated that storage systems exist and/or are being developed that can indeed store the streamed content for later rendering and/or re-distribution to other computing devices. With regard to such storage systems, then, the distributor of the streamed unprotected content would rather not have such unprotected content stored in the unprotected form and without any ability to restrict such re-distribution, if so desired. In particular, the distributor or the like may wish to prohibit the user from copying such streamed content to another storage system or the like, may wish to allow the user to copy with temporal and/or count restrictions, or the like. As may be appreciated, by prohibiting unlimited copying of the streamed content, the distributor can avoid the unchecked dispersal of pristine digital copies of the streamed content, where such unchecked dispersal would encourage other users from foregoing from subscribing to the subscription service offered by such distributor.

In addition, the distributor may wish to provide various users with different rendering rights. For example, the distributor may offer different tiers of service, where higher-level tiers correspondingly command higher subscription fees, and where a user subscribing at a particular tier should not be allowed to access streamed content from higher tiers in an unprotected form.

Note, though, that after the streamed content has been distributed, the distributor has very little if any real control over the streamed content. This is especially problematic in view of the fact that most any personal computer includes the software and hardware necessary to make an exact digital copy of such streamed content, and to download such exact digital copy to a re-distribution medium such as an optical disk, or to send such exact digital copy over a network such as the Internet to any destination.

Of course, as part of a transaction wherein the streamed content is subscribed to, the distributor may require the user/recipient of the streamed content to promise not to re-distribute such content in an unwelcome manner. However, such a promise is easily made and easily broken. The distributor may attempt to prevent such re-distribution through any of several known security devices, usually involving encryption and decryption. However, such security devices if especially simple pose little problem to a mildly determined user who wishes to decrypt encrypted content, save such content in an un-encrypted form, and then re-distribute same.

RM and enforcement architectures and methods have thus been provided to allow the controlled rendering of arbitrary forms of digital content including streamed content, where such control is flexible and definable by the distributor or the like of such digital content. Such architectures allow and facilitate such controlled rendering in the scenario as set forth above.

In one particular arrangement, the streamed content is one of a plurality of streams of such content provided as a combined signal to a receiver. The receiver selects a particular one of the streams upon command from a media system, and provides the selected stream to such media system for further processing. Notably, the selected stream as provided to the receiver is unprotected, but prior to being provided to the media system the selected stream is in fact protected by the receiver according to a particular RM encryption system.

Typically, in an RM encryption system, the content is protected by being encrypted according to a content key (CK). Inasmuch as symmetric encryption and decryption is easier, faster, and less expensive than asymmetric encryption and decryption, such content key (CK) is typically symmetric. Also typically, the content key (CK) is provided by an encryptor such as the receiver to a decryptor such as the media system in an encrypted form and as part of a digital license or the like that specifies license rules that must be satisfied before such content is allowed to be decrypted and rendered by the decryptor/media system.

In the circumstance where the streamed content is one of a plurality of digital television signals that may in effect be tuned by the receiver at the command of the media system, it is to be appreciated that the receiver can be expected to receive commands from the media system to tune in different digital signals on a fairly regular basis, perhaps on the order of as much as once every one-half to one second, especially if the user of the media system is in effect skimming through or 'surfing' several signals. However, and recognizing that each newly tuned signal requires a new license from the receiver, it is to be appreciated that constructing such new license and sending same from the receiver to the media system can be quite burdensome, especially if the license is detailed, includes encrypted elements, includes a digital signature, or the like. Thus, it likely cannot be expected that the receiver completely creates a new license every time the media system commands such receiver to tune a different digital signal, especially if the frequency of such commands is on the order of seconds.

A need exists then, for a system and method for the receiver to create a shortened version of requirements that would go into such a new license such that the receiver need not go to the burden of in fact completely creating such new license every time such receiver newly tunes a digital signal. In particular, a need exists for such a shortened version of such requirements that can be quickly created and sent to the media system each time the receiver newly tunes a digital signal, even if the user is commanding a change on the order of once every second or so. Additionally, a need exists for such a shortened version of such requirements that is concise and yet describes all license requirements for the tuned digital signal in a minimal amount of space. Finally, a need exists for such a shortened version of such requirements that can be employed in connection with streamed digital content as provided to the media system from sources other than the receiver.

Also recognizing that each newly tuned signal may be encrypted by the receiver according to a different content key (CK), it is to be appreciated that informing the media system of such content key (CK) by placing same in a new license and sending same from the receiver to the media system can likewise be quite burdensome. Again, it likely cannot be expected that the receiver completely creates a new license with a new content key (CK) every time the media system commands such receiver to tune a different digital signal, especially if the frequency of such commands is on the order of seconds.

A need exists then, for a system and method for sharing each new content key (CK) between the receiver and the media system without the need for creating an actual license with each such content key (CK) therein. In particular, a need exists for a method by which the receiver and media system can exchange an initial content key and then rotate content keys based on the initial content key. Additionally, a need exists for such a method whereby the receiver and the media system rotate keys in a coordinated fashion.

Further recognizing that the requirements corresponding to a newly tuned signal may be located within the signal on a periodic basis, but that such periodicity may be a relatively long period of time, it is to be appreciated that it may be unreasonable to make the media system wait such a relatively long period of time until such requirements are in fact located within such signal. Especially in the situation where the receiver is tuning in different digital signals on a fairly regular basis, perhaps on the order of as much as once every one-half to one second, it likely cannot be expected that the receiver can wait the relatively long period of time to locate the requirements within the newly tuned signal.

A need exists then, for a system and method for the receiver to send a default set of requirements on a preliminary basis, and then an actual set of requirements when actually located. In particular, a need exists for a method by which the receiver can send such default requirements to be employed by the media system until the actual requirements are sent. Additionally, a need exists for such a method whereby the media system can distinguish between such default requirements and such corresponding actual requirements and can replace the default requirements with the corresponding actual requirements upon receipt thereof.

Finally recognizing that the media system likely will store a relatively large amount of licenses corresponding to newly tuned signals, but that many if not most of such licenses are not needed for very long, it is to be appreciated that such licenses should for the most part be stored on only a temporary basis. Once again, in the situation where the receiver is tuning in different digital signals on a fairly regular basis, perhaps on the order of as much as once every one-half to one second, it likely cannot be expected that all of the corresponding licenses as created and stored by the media system should or could be made available on a permanent basis.

A need exists then, for a system and method for the media system to store at least some licenses corresponding to tuned signals only on a temporary basis. In particular, a need exists for a method by which the media system can recognize which licenses need only be stored on a temporary basis. Additionally, a need exists for such a method whereby the media system deletes such temporarily stored licenses.

SUMMARY OF THE INVENTION

The aforementioned needs are satisfied at least in part by the present invention in which a method is provided for communicating requirements for a digital license from a receiver of corresponding digital content to a computing device upon which the digital content is to be rendered. In the method, the receiver tunes the content and locates within the content information relating to the requirements for the license, constructs the requirements from the located information, and sends such constructed requirements to the computing device.

The computing device upon receiving the sent requirements constructs the license based on such received requirements, stores such constructed license in a license store of such computing device, and thereafter renders the content only in accordance with the license. Thus, the receiver need not communicate the license itself to the computing device.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
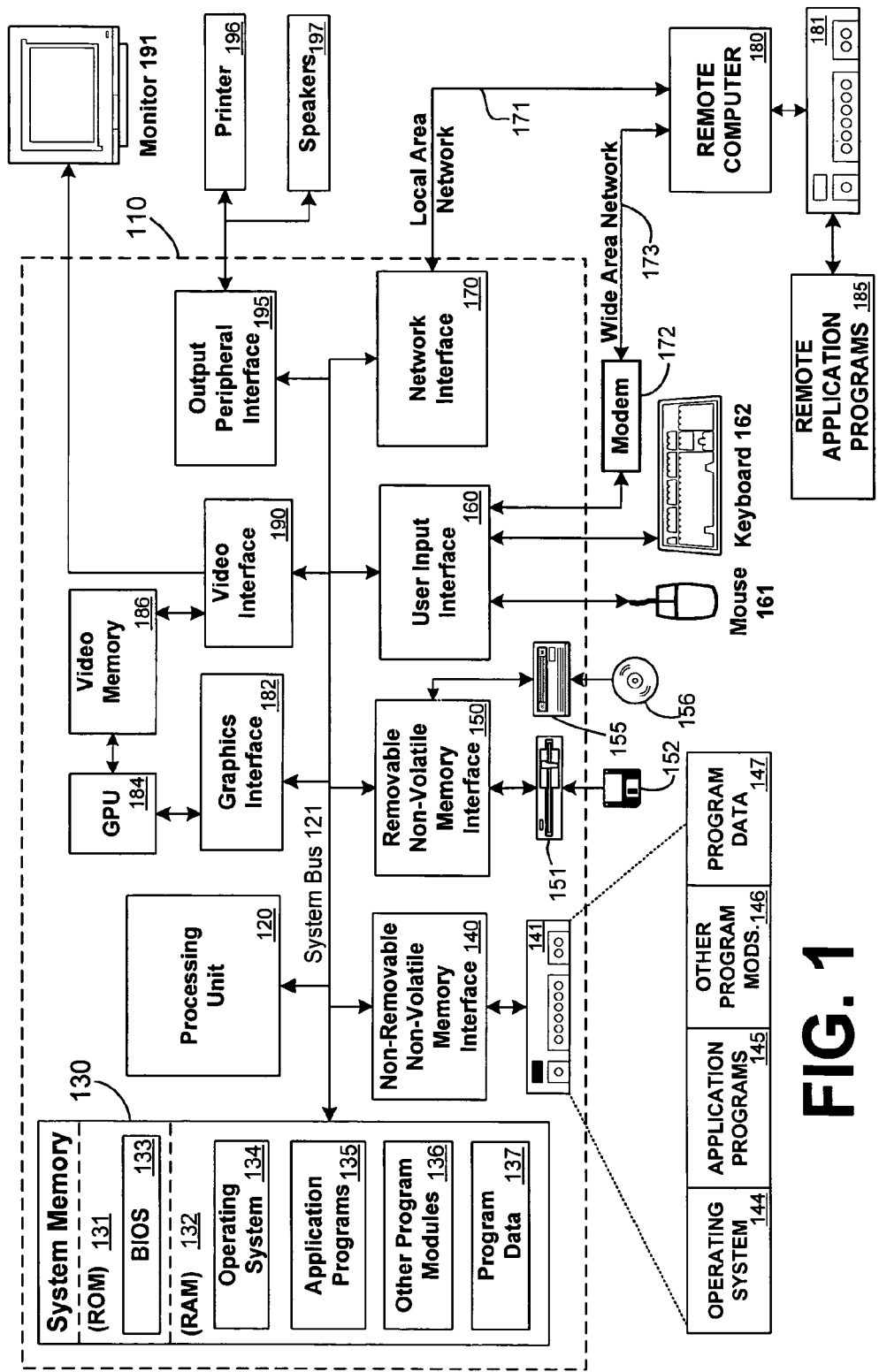
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a stand-alone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
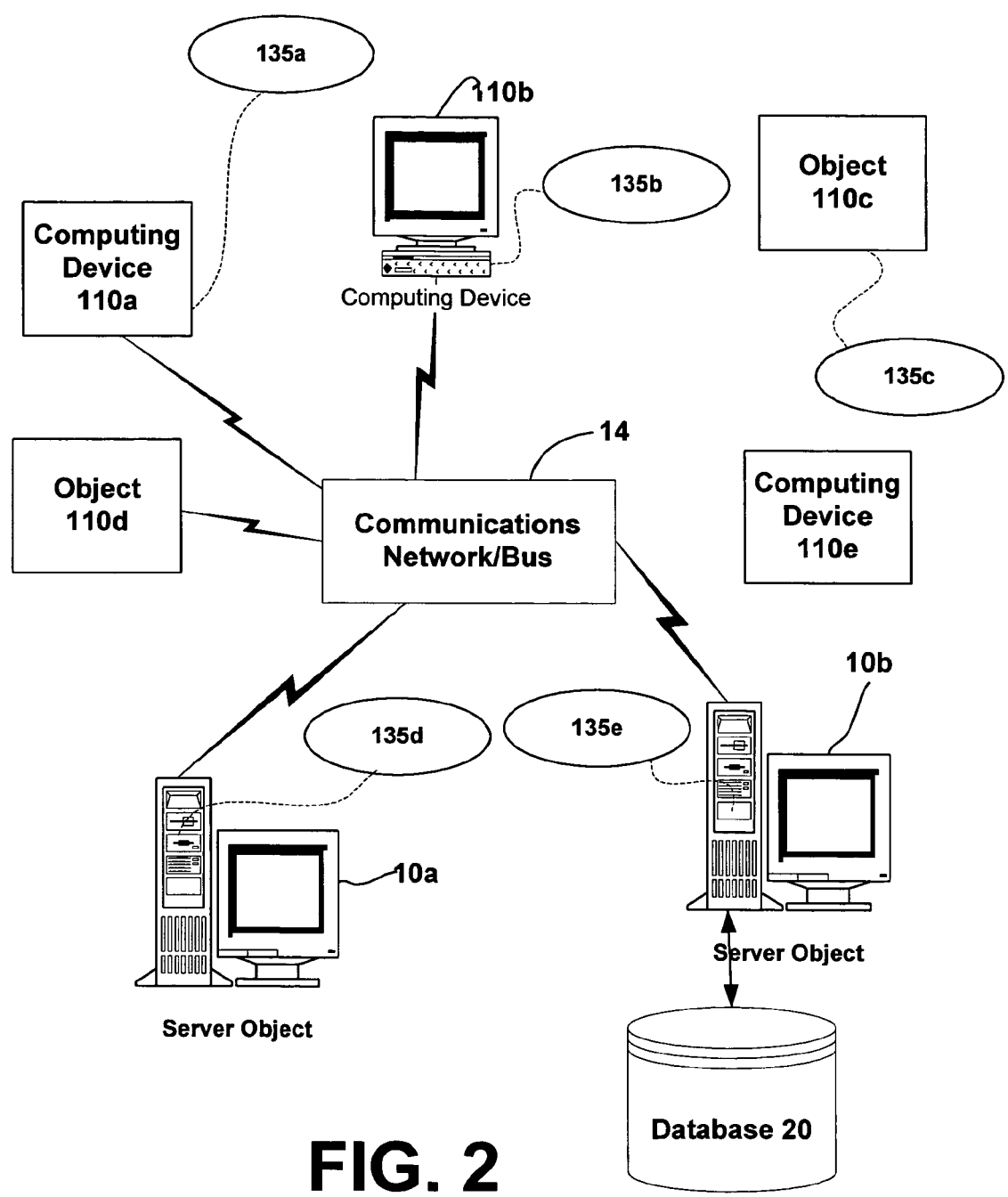
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated.

Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Rights Management (RM) Overview

Figure 3:
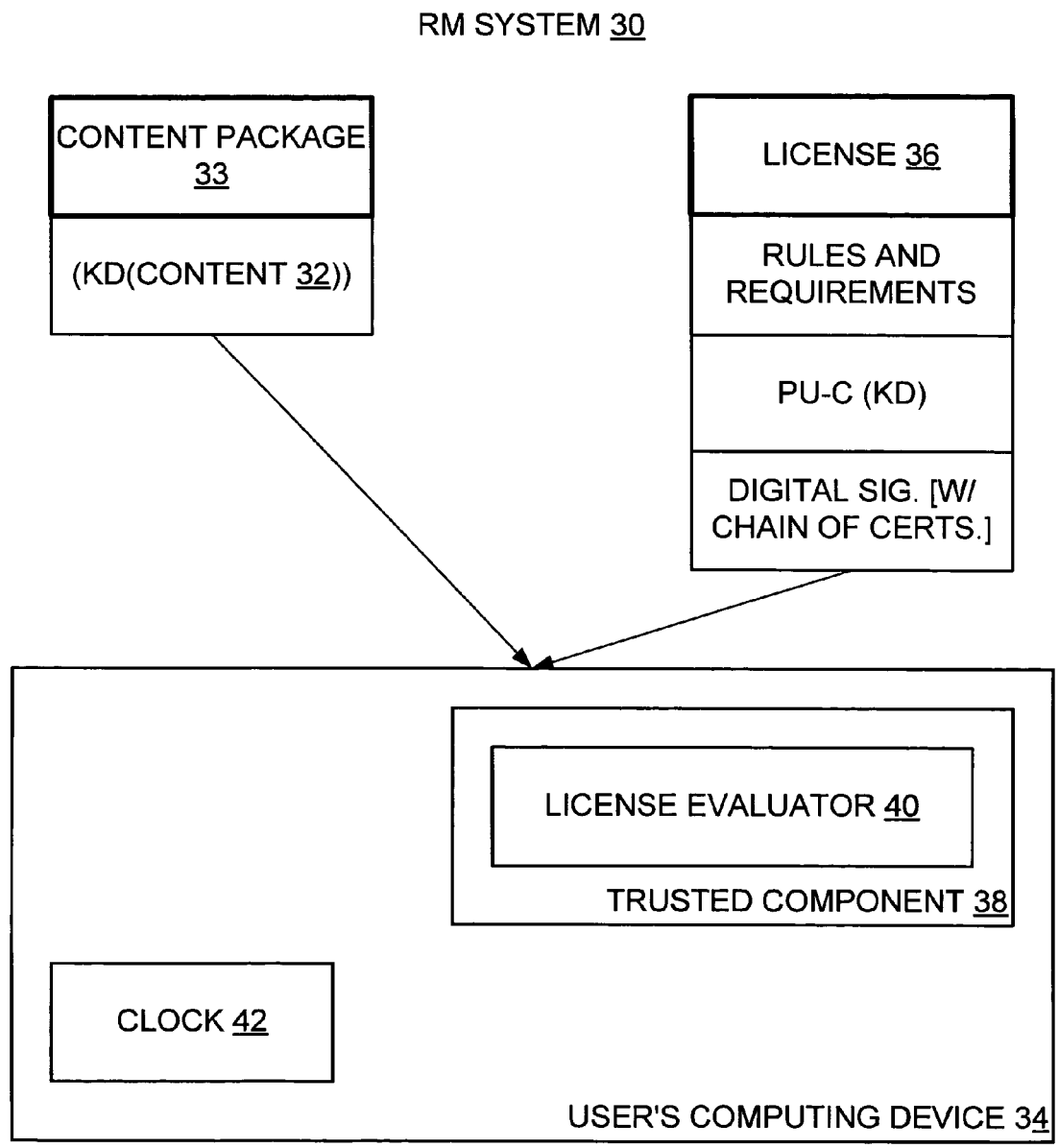
FIG. 3 is a block diagram showing an enforcement architecture of an example of a trust-based system, including a digital license for rendering corresponding digital content in accordance with various embodiments of the present invention.

As is known, and referring now to FIG. 3, rights management (RM) and enforcement is highly desirable in connection with digital content 32 such as digital audio, digital video, digital text, digital data, digital multimedia, etc., where such digital content 32 is to be distributed or redistributed to a user. Upon being received by the user, such user renders the digital content 32 with the aid of an appropriate rendering device such as a media player, text displayer, etc. on a personal computer 34 or the like.

Typically, a content owner or developer or distributor (hereinafter 'distributor') distributing such digital content 32 wishes to restrict what the user can do with such distributed digital content 32, or at least ensure that the content 32 is not redistributed in an unwanted manner. For example, the content distributor may wish to restrict the user from copying and re-distributing such content 32 to a second user, or may wish to allow distributed digital content 32 to be rendered only a limited number of times, only for a certain total time, only on a certain type of machine, only on a certain type of rendering platform, only by a certain type of user, etc.

However, and as was set forth above, after distribution has occurred, such distributor has very little if any control over the digital content 32. An RM system 30, then, allows the controlled rendering of arbitrary forms of digital content 32, where such control is flexible and definable by the content distributor of such digital content. Typically, to protect the content 32, such content 32 is encrypted with a symmetric encryption/decryption key (KD), (i.e., (KD(CONTENT))), and is packaged with other information relevant to the content 32 in a package 33.

The trust-based RM system 30 allows a distributor of digital content 32 to specify at least some license rules that must be satisfied before such digital content 32 is allowed to be rendered by a computing device 34 of a user. Such license rules can include the aforementioned temporal requirement, and may be embodied within a digital license or use document (hereinafter 'license') 36 that the user/user's computing device 34 (hereinafter, such terms are interchangeable unless circumstances require otherwise) must be possess. Such license 36 also includes the decryption key (KD) for decrypting the digital content 32, perhaps encrypted according to a key decryptable by the user's computing device 34. As seen in FIG. 3, such encrypting key is a public key of the user's computing device 34 (PU-C), and the user's computing device 34 presumably has the corresponding private key (PR-C) by which (PU-C(KD)) may be decrypted.

The content distributor for a piece of digital content 32 must trust that the user's computing device 34 will abide by the rules and requirements specified by such content owner in the license 36, i.e. that the digital content 32 will not be rendered unless the rules and requirements within the license 36 are satisfied. Preferably, then, the user's computing device 34 is provided with a trusted component or mechanism 38 that will not render the digital content 32 except according to the license rules embodied in the license 36 associated with the digital content 32 and obtained by the user.

The trusted component 38 typically has a license evaluator 40 that determines whether the license 36 is valid, reviews the license rules and requirements in such valid license 36, and determines based on the reviewed license rules and requirements whether the requesting user has the right to render the requested digital content 32 in the manner sought, among other things. As should be understood, the license evaluator 40 is trusted in the RM system 30 to carry out the wishes of the owner of the digital content 32 according to the rules and requirements in the license 36, and the user should not be able to easily alter such trusted element for any purpose, nefarious or otherwise.

As should be understood, the rules and requirements in the license 36 might specify whether the user has rights to render the digital content 32 based on any of several factors, including who the user is, where the user is located, what type of computing device the user is using, what rendering application is calling the RM system 30, the date, the time, etc. In addition, the rules and requirements of the license 36 may limit the license 36 to a pre-determined number of renderings, or pre-determined rendering time, for example. Thus, the trusted component 38 may need to refer to a clock 42 on the computing device 34. If such clock 42 is provided, such clock 42 may be a secure clock 42 that cannot be tampered with by a user in an effort to overcome a temporal restriction of a license 36.

The rules and requirements may be specified in the license 36 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 40 determining that the license 36 is valid and that the user satisfies the rules and requirements therein, the digital content 32 can then be rendered. In particular, to render the content 32, the decryption key (KD) is obtained from the license 36 and is applied to (KD(CONTENT)) from the content package 33 to result in the actual content 32, and the actual content 32 is then in fact rendered. As set forth above, the license 36 with (PU-C (KD)) in effect authorizes an entity in possession of (PR-C) to access (KD) and thereby access the content 32 encrypted according to such (KD), presuming of course that the entity abides by all conditions as set forth in the license 36.

Note that a license 36 typically includes a digital signature for authentication/validation purposes. Likewise, other forms of digital constructs such as a piece of digital content 32 may also have such a digital signature for authentication/validation purposes. As should be known, such a digital signature may be constructed based on a first key from a pair of asymmetric keys or from a symmetric integrity key, for example by performing some sort of hash on the underlying data to which the signature is attached and then encrypting the hash with the key. Thereafter, the signature is validated by applying the second key from the pair of asymmetric keys or the integrity key, again for example by decrypting the encrypted hash and comparing the decrypted hash to another hash of the underlying data to which the signature is attached. If the hashes match, it can be presumed that the underlying data has not been altered and the underlying construct therefore can be authenticated. Typically, an RM system 30 will not honor a license 36 or the like that is not authenticated.

System for Receiving and Handling Streamed Multimedia Content 32

Figure 4:
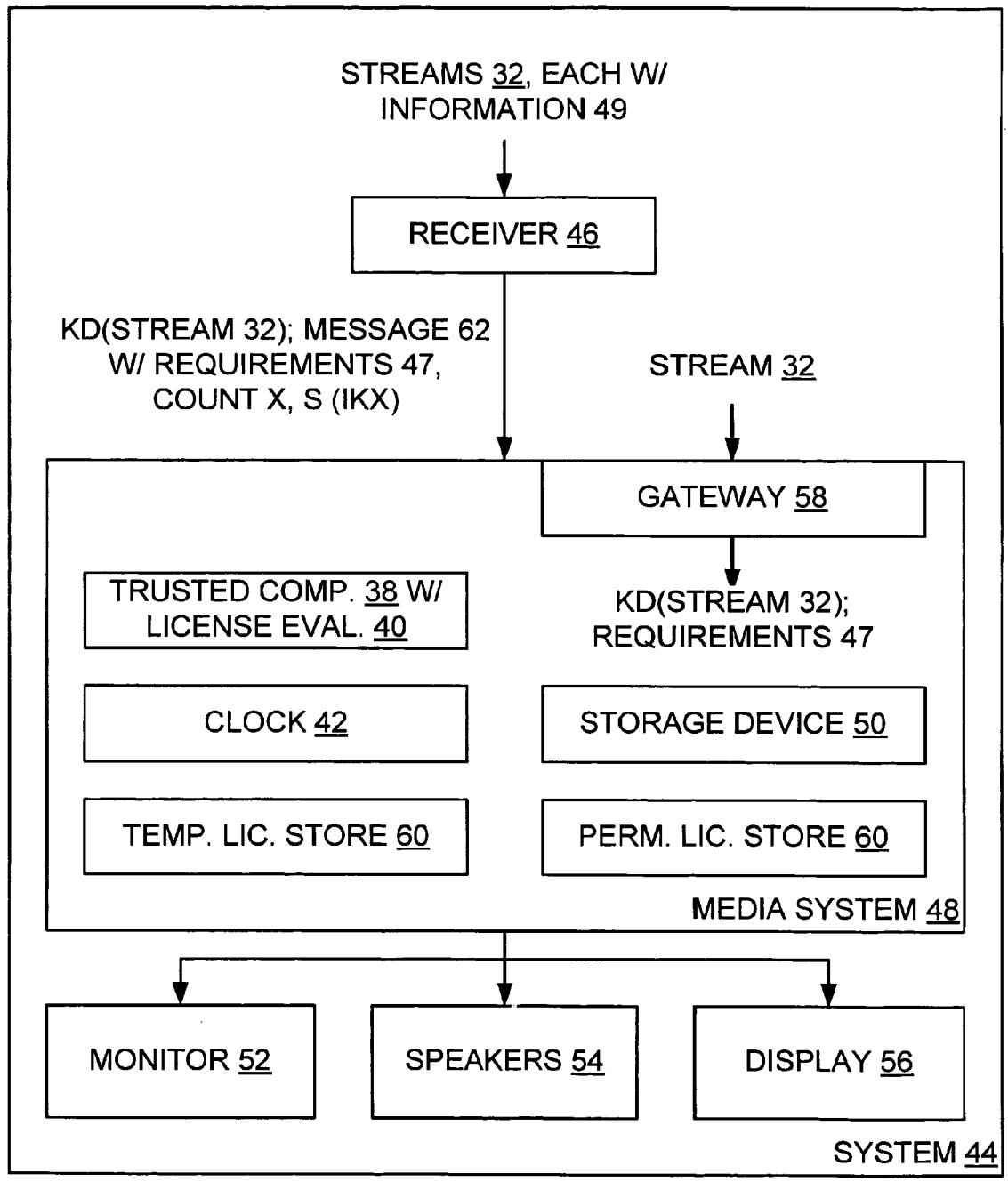
FIG. 4 is a block diagram showing an example of the trust-based system of FIG. 3, and in particular shows a receiver forwarding an encrypted stream of content to a media system for rendering thereby in accordance with various embodiments of the present invention.

Turning now to FIG. 4, a system 44 for receiving and handling multimedia content 32 is shown. As should be evident, such system 44 is particularly suited for handling an input signal comprising multiple streams of multimedia content 32, such as for example a television signal from a multi-channel distributor. However, such will be system 44 may also handle other input signals without departing from the spirit and scope of the present invention.

In the system 44, the aforementioned input signal as provided by the distributor thereof is applied to a receiver 46 which may be any appropriate receiver without departing from the spirit and scope of the present invention, presuming of course such receiver can perform the functions set forth herein. For example, the receiver 46 may be a Uni-Directional Cable Receiver (UDCR) such as is being developed to receive a digital cable television signal and forward same for further digital processing including rendering of content 32 therein. As may be appreciated, the receiver 46 upon being so commanded tunes one of the multiple streams of multimedia content 32 from the input signal and forwards same for further processing. In addition, the receiver 46 prior to forwarding the tuned stream of content 32 may if necessary convert such stream 32 from a native format to a format more amenable for such further processing.

As envisioned, each of the multiple streams of multimedia content 32 in the input signal may or may not be encrypted. Upon tuning a particular stream of content 32 within the input signal, the receiver 46 decrypts such stream if encrypted and re-encrypts same in a manner that will be set forth in more detail below, or merely encrypts the stream if not encrypted, again in a manner that will be set forth in more detail below. As was alluded to above, the receiver 46 encrypts the stream of content 32 as part of ensuring that the stream is RM-protected. Thus, the stream of content 32 is not available to be redistributed in an unprotected form.

As also shown in FIG. 4, a media system 48 is provided to receive the encrypted stream of content 32 from the receiver 46 and further process same. Presumably, the media system 48 commanded the receiver 46 to tune the particular stream of content 32 from within the input signal, perhaps upon receiving a corresponding command from a user, although it maybe appreciated that such a command may be initiated by other sources without departing from the spirit and scope of the present invention. At any rate, upon receiving the stream of content 32 from the receiver 46, the media system 48 stores same in an appropriate storage device 50 for retrieval and rendering, either immediately or upon some time delay. Upon rendering of the stream 32, the media system 48 forwards appropriate signals to one or more output devices such as one or more monitors 52, speakers 54, other displays 56, and the like.

Inasmuch as the stored stream 32 is in the RM-protected form, the media system 48 includes RM components such as the trusted component 38, license evaluator 40, and clock 42 of FIG. 3. Thus, upon retrieving a particular stream 32, the media system 48 renders same, but only in accordance with a corresponding license 36 as will be set forth in more detail below. Accordingly, the encrypted stream 32 is decrypted and rendered only if such license 36 so allows, and with the content key (CK) set forth in the license 36. Note that inasmuch as the encrypted stream 32 is stored at least temporarily on the (first) media system 48, a user thereof may in theory copy same to another (second) media system 48 for rendering thereby. However, inasmuch as the stream is encrypted and decryptable only according to the license 36, and inasmuch as the license 36 is tied to the first media system 48, such license 36 may not be employed by the second media system 48.

As should be understood, though, it may be the case that the first media system 48 can issue a sub-license 36 for the copied stream 32 to the second media system 48, presuming the first media system 48 is in fact capable of doing so and the license 36 so allows. If so, the sub-license 36 as tied to the second media system 48 can in fact be employed by the second media system 48 to render the stream 32, as will be set forth in more detail below.

Communicating License Requirements from Receiver 46 to Media System 48

As was set forth above, it is to be appreciated that the receiver 46 can be expected to receive commands from the media system 48 to tune in different digital streams 32 from the input signal on a fairly regular basis, perhaps on the order of as much as once every one-half to one second, especially if a user of the media system 48 is in effect skimming through or 'surfing' several streams 32. However, each newly tuned stream 32 requires a new corresponding license 36 with a new content key (CK). Typically, such license 36 would be constructed by the receiver 46 and delivered from the receiver 46 to the media system 48 just prior to delivering the tuned stream 32.

However, it is to be appreciated that constructing such new license 36 and sending same from the receiver 46 to the media system 48 can be quite burdensome, especially if the license 36 is detailed, includes encrypted elements, includes a digital signature, or the like. Thus, it likely cannot be expected that the receiver 46 can completely construct a new license 36 for a newly tuned stream 32 every time the media system commands such receiver to in fact tune such stream 32. This is especially true if the frequency of such commands is on the order of seconds, as is the case for the aforementioned surfing situation. This is also especially true if the receiver 46 is not provided with especially significant computing power as may be necessary to construct such license 36 in an expeditious manner. At any rate, a typical user commanding a new stream 32 to be tuned would expect such new stream 32 to be rendered and presented in no more than a second or two after the command has been issued.

Clearly, then, the receiver 46 likely cannot send a new license 36 each time a stream 32 is newly tuned. Instead, and in one embodiment of the present invention, the receiver 46 creates and sends an abbreviated or shortened version of requirements 47 that would go into such a new license 36, and the media system 48 upon receiving such requirements 47 is trusted by the receiver 46 to construct such a new license 36 on behalf of the receiver 46, presumably with the aid of computing power greater than that which is available to the receiver 46.

Presumably, the receiver 46 determines the requirements 47 for the stream 32 from information 49 within the stream 32 itself. Determining such requirements 47 from the information 49 in the stream 32 is known or should be apparent to the relevant public and therefore need not be set forth herein in any detail, and accordingly any method of determining such requirements 47 from the stream 32 may be employed without departing from the spirit and scope of the present invention. For example, it may be the case that the stream 32 as distributed is periodically supplied with the information 49 at a known interval and location.

The requirements 47 as specified for a particular stream 32 by the receiver 46 may of course be any requirements 47 without departing from the spirit and scope of the present invention. Typically, though, the requirements 47 specify at least in part whether the stream 32 as stored in the storage device 50 of a first media system 48 and as licensed to such first media system 48 may in fact be copied to and sub-licensed to a second media system 48. For example, such a copy right may be stated as copy freely (CF), copy once (CO), copy never (CN), and the like.

Thus, with the present invention, the receiver 46 need not go to the burden of in fact constructing such new license 36 every time such receiver 46 newly tunes a particular stream 32, and the shortened version of the requirements 47 of such license 36 can be quickly created and sent to the media system 48 each time the receiver newly tunes a stream 32, even if the user is commanding a change on the order of once every second or so.

Moreover, and as may be appreciated, by sending only the requirements 47 and not the license 36 itself, the receiver 46 need not be burdened with any particular format of the license 36 itself. Thus, if at some point a new format is specified for the license 36, such format need only be communicated to the media system 48 and not the receiver 46.

Still referring to FIG. 4, it is seen that in addition to receiving a stream 32 from the receiver 46, the media system 48 may additionally receive streams 32 from other sources, either directly or indirectly. Such other sources may for example comprise an NTSC input signal, an ATSC input signal, and the like. As seen, for each of at least some input signals received directly, it may be the case that the media system 48 includes either a hardware or software gateway 58 that acts in the manner of the receiver 46 to both convert a stream 32 within the received input signal to an encrypted format more amenable to the media system 48, and also to create and send an abbreviated or shortened version of requirements 47 for the stream 32 that would go into a new license 36 as created by the media system 48. Here, the gateway 58 could determine the requirements 47 for the stream 32 from the information 49 within the stream 32 itself, or could compose default requirements 47 if not available from such stream 32.

In one embodiment of the present invention, the requirements 47 as provided for any particular stream 32 from any particular source are set forth in a common format. Accordingly, the media system 48 need not be concerned with multiple formats corresponding to different sources. In one embodiment of the present invention, the common format is of a relatively abbreviated nature such that the requirements 47 can be quickly and easily transmitted to or within the media system 48 and the media system 48 can likewise quickly construct a license 36 therefrom.

Figure 5:
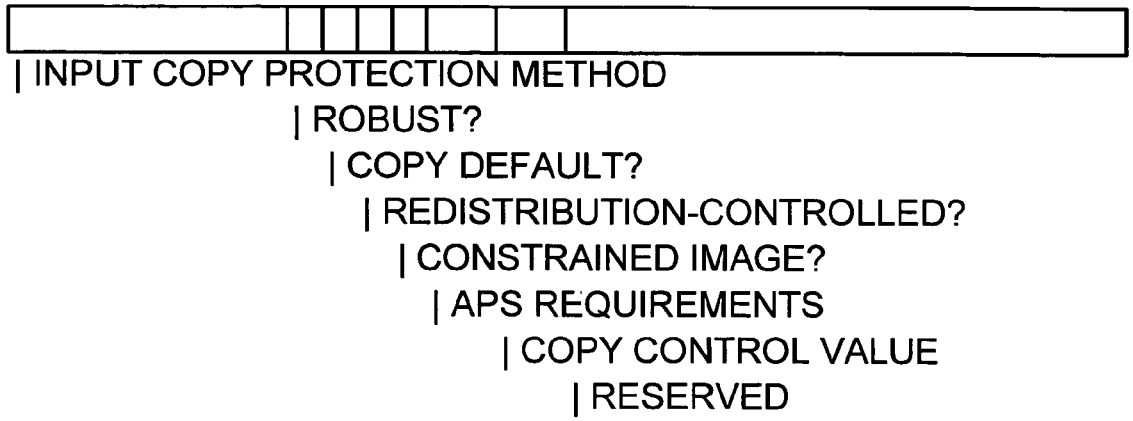
FIG. 5 is a block diagram showing an abbreviated version of requirements in connection with the encrypted content of FIG. 4 and as sent by the receiver of FIG. 4 to the media system of FIG. 4 in accordance with one embodiment of the present invention.

For example, and turning now to FIG. 5, it is seen that in one embodiment of the present invention, the common format has 32-bits divided into a number of pre-defined fields. The fields are defined as follows:

Input Copy Protection Method—This field specifies an 8-bit value that corresponds in a predetermined manner to the particular content protection method of the corresponding stream 32. Such content protection methods may include but are not limited to:

- None—No copy protection is specified for the stream 32, and no RM-based restrictions should be imposed on same.
- Hardware Macrovision—The stream 32 is Macrovision (waveform) protected.
- CGMS-A—The stream 32 contains CGMS-A content protection as specified by IEC 61880 or EIA-608-B.
- WSS—The stream 32 contains WSS protection as specified by ITU-R BT 1119-1.
- Cable Labs Digital Cable—The stream 32 was delivered to a Cable Labs UDCR receiver 46.
- ATSC—the stream 32 was delivered in the Advanced Television Systems Committee (ATSC) format.

Input Device Meets Robustness Rules—This one-bit field is set to 1 if the input device (e.g., a tuner card as the receiver 46) meets the robustness rules defined by the input copy protection method.

Copy Default—This one-bit field is set to 1 if the copy protection requirements 47 are not yet known from the stream 32 and default copy protection is to be applied.

Broadcast Flag/Restricted Content—This one-bit field is unique to ATSC and is set to 1 if the stream 32 is redistribution-controlled.

CIT—This one-bit field is unique to Cable Labs Digital Cable and is set to 1 if the Constrained Image has been triggered.

APS—This two-bit field represents Analog Protection System requirements 47 unique to certain Macrovision formats.

Copy Control Value—This two-bit field represents how the stream 32 may be copied (sub-licensed) from the media system 48 to another media system 48: copy freely (CF), copy once (CO), copy never (CN), and the like.

Notably, in the one embodiment shown in FIG. 5, 16 of the 32 bits are reserved for later use. Accordingly, features unique to a new type of copy protection may be implemented within the reserved bits, as may be additional features already present in current types of copy protection. Also notably, specific bits that currently are reserved for use only in connection with certain types of copy protection, and therefore not of use in connection with other types of copy protection, may nevertheless be employed in connection with such other types of copy protection for different purposes.

As may now be appreciated, by employing a common format to represent the requirements 47 for a license 36 corresponding to a particular stream 32, such requirements 47 can be specified in a common manner that is agnostic to any particular format of such stream 32 as distributed. The requirements 47 are succinctly specified in a manner not specific to any particular source content protection mechanism, and a relatively simple device such as the receiver 46 or a gateway 58 (hereinafter, 'receiver 46' unless circumstances dictate otherwise) can derive the requirements 47 from any specific format and translate same into a common format.

Figure 6:
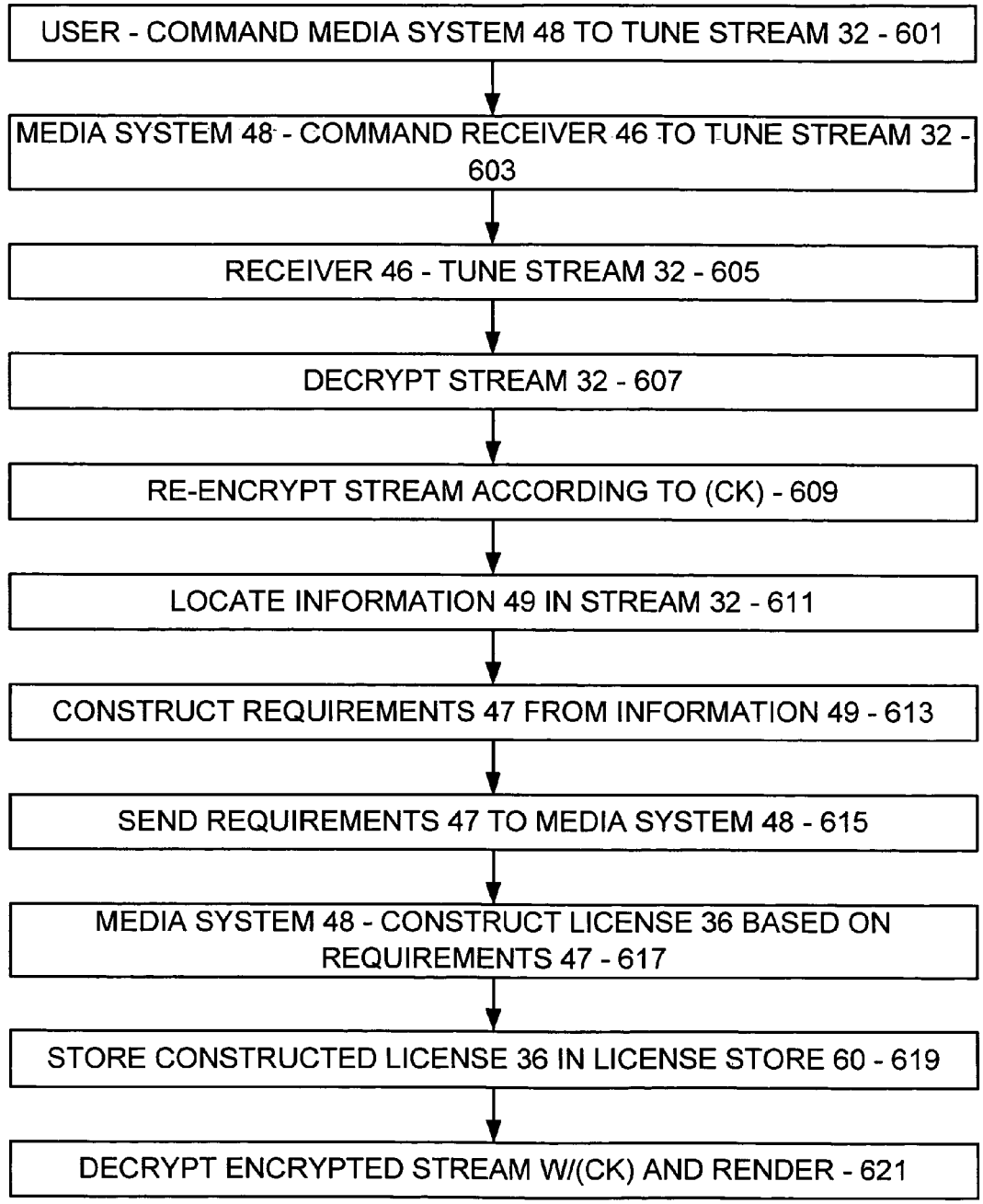
FIGS. 6-9 are flow diagrams showing key steps performed by the receiver and media system of FIG. 4 in accordance with various embodiments of the present invention, including the receiver sending the requirements of FIG. 5 to the media system (FIG. 6), the receiver and the media system each deriving a content key (CK) for a newly tuned stream (FIG. 7), the receiver sending a default derived message with default requirements to the media system for a newly tuned stream prior to encountering information in the stream from which actual requirements can be constructed (FIG. 8), and the media system employing a temporary license store and deleting marked licenses therefrom by way of a housekeeping function (FIG. 9).

Turning now to FIG. 6, it is seen that a method employed by the receiver 46 in response to a command to tune a particular stream 32 is shown. As may be appreciated, such command is typically issued initially by a user to the media system 48 (step 601) and then from the media system 48 to the receiver 46 (step 603), although the media system may alternately issue such tuning command without prompting from the user without departing from the spirit and scope of the present invention. At any rate, in response to the tuning command, the receiver 46 in fact tunes the stream 32 at issue (step 605). Such tuning is generally known or should be apparent to the relevant public and therefore need not be set forth herein in any detail. Accordingly, such tuning may be performed in any appropriate manner without departing from the spirit and scope of the present invention.

Once tuned, the receiver 46 decrypts the stream 32 if necessary (step 607) and re-encrypts same according to a symmetric content key (CK) that is shared with the media system 48 (step 609). One method of sharing such content key (CK) with the media system 48 is set forth below, although it is to be appreciated that most any such method may be employed without departing from the spirit and scope of the present invention.

In addition, from the decrypted stream 32, the receiver 46 may locate the aforementioned information 49 relating to the requirements 47 for a license 36 corresponding to the stream 32 (step 611). As was set forth above, such information 49 with such requirements 47 may be periodically supplied within the stream 32 at a known interval and location. For example, such known interval may be on the order of once every 20 seconds, and the location may be a particular identified packet if the stream 32 is digital or a particular video blanking interval if the stream 32 is analog. As will be set forth below in more detail, in the case where the receiver 46 has not as yet encountered such information 49 in the stream 32, and where waiting for such information 49 is not feasible, the receiver 46 may proceed by sending requirements 47 based on some default set of information 49 and at a later time when actual information 49 is received send actual requirements 47.

At any rate, with the located information 49, the receiver 46 constructs a set of requirements 47 corresponding to the stream 32 (step 613), where such requirements 47 may be expressed in the aforementioned common format, and sends such requirements 47 to the media system 48 (step 615), and in particular to the trusted component 38 of the media system 48. Thereafter, the media system 48 constructs a license 36 based on the requirements 47 (step 617) and stores such constructed license 36 in a license store 60 thereof or the like (step 619).

Constructing such license 36 from such requirements 47 is generally known or should be apparent to the relevant public and therefore need not be set forth herein in any detail. Accordingly, such construction of such license 36 may be performed in any appropriate manner without departing from the spirit and scope of the present invention. For example, and in the case where the requirements 47 are expressed according to the 32-bit common format set forth above or the like, the media system 48 may employ a mapping algorithm that maps each field of bits to a license 36 according to pre-defined mapping rules.

Note that in constructing the license 36, the media system 48 presumably stores the content key (CK) for the stream, which may be obtained in a manner set forth below, within the license 36 encrypted according to another key such as a public key of such media system 48 (PU-MS) to result in (PU-MS(CK)). Thus, only that media system 48 may access (CK) from (PU-MS(CK)) from the license 36 with the aid of a private key (PR-MS) corresponding to (PU-MS). As a result, such license 36 may be said to be tied to such media system 48 and may not be employed by any other media system 48 or other device. If the license 36 authorizes the media system 48 to issue a sub-license 36 for another media system 48 to render the stream 32 by for example stating a copy right such as copy freely (CF) or copy once (CO), such media system 48 in creating the sub-license 36 must first apply (PR-MS) to (PU-MS(CK)) to reveal (CK) and then must encrypt (CK) according to a (PU-MS) of the another media system 48, and then may insert such a new (PU-MS (CK)) into the sub-license 36.

Note that the media system 48 is likely in possession of the content key (CK) for a particular stream 32 prior to constructing a corresponding license 36 for same, and therefore may employ such content key (CK) to decrypt the encrypted stream as sent from the receiver 46 and render such decrypted stream 32 (step 621). One may therefore question the need for the media system to construct and store the license as at steps 617 and 619. However, it should be appreciated that the stored license 36 may be used by the media system 48 if need be to retrieve the content key (CK), such as for example if the media system 48 somehow loses such (CK) during a reset or the like. Likewise, if the media system 48 is playing back the stream 32 from the storage device 50 on a delayed basis, the license 36 may be the only location where such (CK) is stored. Also, the license 36 is necessary to store and retrieve any copy rights associated with the stream 32, as well as the other requirements 47 corresponding to the stream 32, which may need to be referred to at some future point.

Note that for any particular stream 32, it may be the case that the information 49 thereof may change one or more times. If so, and as may be appreciated, the receiver 46 should issue new requirements 47 to the media system 48 as at steps 613 and 615 and the media system should construct and store a new license 36 as at steps 617 and 619. Thus, the receiver 46 should be aware of each set of information 49 within the stream 32 and should note when such set of information 39 has changed within the stream 32.

Sharing Content Keys Between Receiver 46 and Media System 48

As was set forth above, each time the receiver 46 tunes a different stream 32, the receiver sends the newly tuned stream 32 encrypted according to a different content key (CK), and also sends a set of corresponding requirements 47. Thus, the receiver 46 and the media system 48 must somehow share content keys (CK), and in particular the media system 48 must know what content key (CK) the receiver 46 has employed to encrypt a particular stream 32.

However, and significantly, it is not presently envisioned that the receiver 46 transmit each content key (CK) for each particular stream 32 to the media system 48, for example as part of the requirements 47 or within a typical RM license 36. As was set forth above, the receiver 46 cannot be expected to construct and send such a typical RM license 36 for each newly tuned stream 32 because constructing such a license 36 is so labor-intensive and because it can be the case that a newly tuned stream 32 can be commanded as often as once every second or so. Thus, the receiver 46 and the media system 48 must somehow share such content key (CK) through a different method of communication.

Accordingly, and in one embodiment of the present invention, the receiver 46 and the mediasystem 48 as part of an initialization share an initial content key (CK0) by way of a more-or-less typical RM license 36, and then each of the receiver 46 and the media system 48 derive a new content key (CKx) from (CK(0)), either directly or indirectly, on an as-needed basis and in a coordinated fashion. Significantly, the initialization RM license 36 is required only once until another initialization is necessary, and accordingly the labor-intensive aspects of such RM license 36 are encountered only once until another initialization is necessary. Note that such an initialization may be performed according to any appropriate interval without departing from the spirit and scope of the present invention. For example, an initialization may be performed once every few hours or few days or so, or may be performed once each time the media system 48 is started or is reset.

Figure 7:
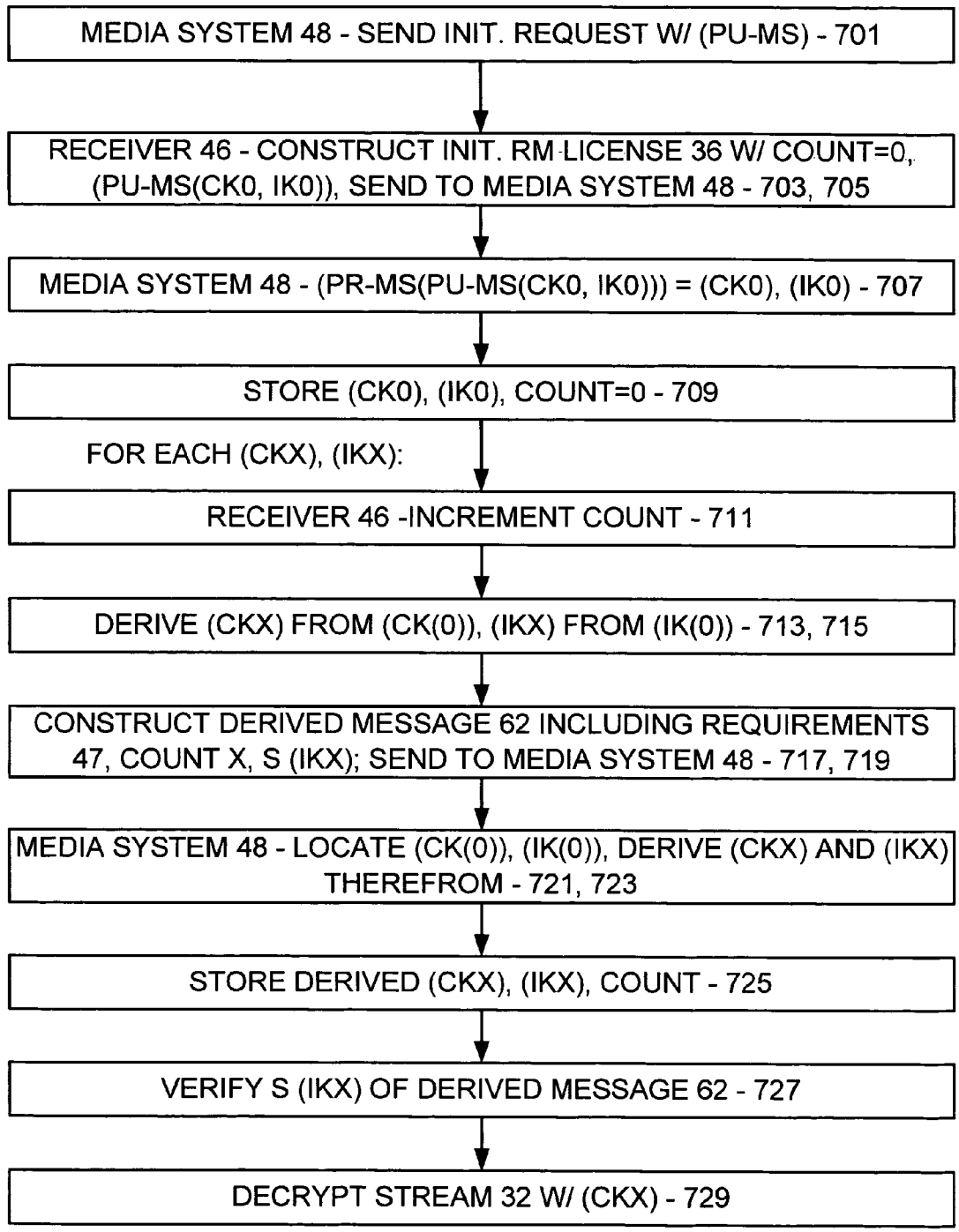

In one embodiment of the present invention, and turning now to FIG. 7, upon an initialization event, the media system 48 sends an initialization request to the receiver 46 (step 701), where such initialization request includes a machine certificate or the like issued to the media system 48 by an authority or chain of authority trusted by the receiver 46. Significantly, the sent machine certificate includes a public key of the media system (PU-MS), and the media system is in possession of a corresponding private key (PR-MS).

Thereafter, the receiver 46 satisfies itself based on the sent machine certificate that the media system 48 may be trusted, constructs the initialization RM license 36 (step 703), and sends the initialization license 36 to the media system 48 (step 705). Significantly, the initialization license 36 includes an initial content key (CK0) as decided upon by the receiver 46, where such initial content key (CK0) is encrypted according to the public key (PU-MS) from the machine certificate to result in (PU-MS(CK0)). Thus, the media system 48 upon receiving the initialization license 36 and storing same in a license store 60 retrieves such (PU-MS(CK0)) therefrom and applies (PR-MS) thereto to result in (CK0) (step 707), and then stores such (CK0) in an appropriate secure location along with a count, which here would be set to zero (step 709). As may be appreciated, the receiver 46 also stores such (CK0) in an appropriate secure location along with the same zero count.

Note that the initialization license 36 may be signed by the receiver 46, in which case the receiver may employ a symmetric integrity key (IK) to in effect sign such initialization license 36 based on a symmetric signing protocol such as a MAC. If so, and in one embodiment of the invention, the initial content key (CK0) and the integrity key (IK) as an initial integrity key (IK0) are both encrypted according to the public key (PU-MS) from the machine certificate to result in (PU-MS(CK0, IK0)). Here, then, the media system 48 upon receiving the initialization license 36 retrieves such (PU-MS(CK0, IK0)) therefrom and applies (PR-MS) thereto to result in (CK0) and (IK0) as at step 707, and then stores such (CK0) and (IK0) and zero count in an appropriate secure location as at step 709. In addition, the media system 48 employs such initial integrity key (IK0) to verify the signature of such initialization license 36.

To summarize thus far, then, both the receiver 46 and the media system 48 have stored in a secure location an initial content key (CK0), an initial integrity key (IK0) and a count set to zero. However, the receiver has not yet begun to send the stream 32 to the media system 48 encrypted according to any content key (CK), or any corresponding requirements 47. Presumably, though, the media system 48 at some point does command a first instance of such a situation, as at step 603 of FIG. 6. Accordingly, the receiver proceeds with the steps of such FIG. 6 to the point where such receiver requires a first new symmetric content key (CKx), which would be (CK1), to encrypt a first stream 32, as at step 609.

Here, and in one embodiment of the present invention, the receiver 46 generates such content key (CKx)/(CK1) by incrementing the count (step 711) and deriving (CKx)/(CK1) from the initial content key (CK0) (step 713). Moreover, when deriving such a content key (CKx) from such initial content key (CK(0)), the receiver 46 also derives a corresponding integrity key (IKx)/(IK1) from the initial integrity key (IK0) (step 715).

In one embodiment of the present invention, both the content key (CKx) and the integrity key (IKx) are derived from (CK(0)) and (IK(0)), respectively, by applying the initial value (CK(0)) or (IK(0)) a function along with the new count value:

value($x$)=function(value(0),count)

For example, such function may a one-way hash function such as a SHA function, perhaps with appropriate truncation or lengthening as need be. Thus, with such content key (CKx), the receiver 46 may encrypt the stream 32 as at step 609.

In one embodiment of the present invention, the receiver 46 communicates the derivation or rotation of such keys (CKx, IKx) and the new count to the media system 48 when the receiver 46 constructs the set of requirements 47 corresponding to the stream 32 and sends such requirements. 47 to the media system 48, as at steps 613 and 615 of FIG. 6. In particular, and in one embodiment of the present invention, the receiver 46 when performing such steps 613 and 615 in fact constructs a derived message 62 with values therein that are based on the values in the initialization license 36 sent as at step 705.

In particular for any particular stream 32 corresponding to a particular count x, such as for example the first stream 32 corresponding to count=1, the receiver 46 constructs a derived message 62 including: the requirements 47 for such stream 32, the count x, and a signature based on the integrity key (IKx) (step 717), and sends the constructed derived message 62 to the media system 48 (step 719). Note that inasmuch as the signature is based on a symmetric key, constructing such a derived message 62 is not nearly as burdensome to the receiver 46 as compared with a signature based on an asymmetric key.

At any rate, upon receiving the stream 32 and the derived message 62 corresponding thereto, the media system 48 can itself derive the corresponding content key (CKx) and integrity key (IKx) based on knowledge of the count from such received derived message 62, (CK(0)), (IK(0)), and the function used at step 715. In particular, and as with the receiver 46, the media system 48 locates each of (CK(0)) and (IK(O)) (step 721), derives (CKx) and (IKx) by employing the same function as the receiver 46 and the current count x (step 723), and stores such derived (CKx) and (IKx) along with the corresponding count as may be appropriate (step 725). In addition, the media system 48 employs such integrity key (IKx) to verify the signature of the corresponding derived message 62 (step 727). Most significantly, with the content key (CKx) corresponding to the stream 32, and presuming the corresponding derived message 62 verifies and allows, the media system 48 can decrypt the stream 32 for rendering and/or further processing (step 729).

It should be noted that the derived message 62 as received from the receiver 46 by the media system 48 is not the license 36 constructed and stored by the media system 48 in a license store 60 as at steps 617 and 619 of FIG. 6. Instead, and as should be appreciated, the derived message 62 contains the requirements 47 that are employed to construct the license 36 of such steps 617 and 619.

With the present invention as set forth herein, the receiver 46 need not explicitly communicate a content key (CKx) or integrity key (IKx) to the media system 48 for every newly tuned stream 32. Instead, the receiver 46 need only establish initial values of such keys (CK0, IK0) with the media system 48, and then each of the receiver 46 and the media system 48 can independently derive new values (CKx, IKx) for each new stream 32 based on prior knowledge of (CK(0), IK(0)) and the deriving function. Thus, the receiver 46 need not go to the considerable burden of constructing a typical RM license 36 for each new stream 32, with (CKx) asymmetrically encrypted therein and such RM license being asymmetrically signed. Instead, the receiver 46 need only construct such a typical RM license 36 when initializing with the media system 48, and thereafter can construct a less-burdensome derived message 62 for each new stream 32, without (CKx) encrypted therein and being symmetrically signed.

Note that in an alternate embodiment of the present invention, rather than deriving (CKx) and (IKx) from (CK(0)) and (IK(0)), respectively, such (CKx) and (IKx) may be derived from (CK(x−1)) and (IK(x−1)), respectively. As should be appreciated, doing so is similar to deriving (CKx) and (IKx) from (CK(0)) and (IK(0)) in most respects except that (CK(x)) and (IK(x)) need to be stored and retrieved for deriving (CK(x+1)) and (IK(x+1)), as may be appreciated.

Note too that in sharing the content keys between the receiver 46 and the media system 48, such elements may communicate with each other using secure methods, such as for example authentication and the like. Alternatively, if circumstances warrant, un-secure methods may also be employed.

Default Derived Message 62

As was set forth and/or alluded to above, in constructing a derived message 62 corresponding to a particular newly tuned stream 32, the receiver 46 locates the information 49 relating to the requirements 47 for the derived message 62 from the stream 32, as at step 611, where such information 49 with such requirements 47 may be periodically supplied within the stream 32 at a known interval and location. Such known interval may be on the order of once every 20 seconds or longer, and accordingly it is likely very often the case that the receiver 46 will not encounter such information 49 in the stream 32 without having to wait a considerable length of time. However, such a wait is not feasible, especially if the receiver 46 is expected to send such a derived message 62 with requirements 47 based on such information 49 within the time frame of a second or so after being commanded to tune the stream 32.

Accordingly, in one embodiment of the present invention, if the receiver 46 is not in possession of the information 49 from the newly tuned stream 32 in time to construct requirements 47 based thereon, place same in a corresponding derived message 62, and send the derived message 62 in a timely manner, as at steps 715 and 717 of FIG. 7, the receiver 46 instead constructs and sends a default derived message 62. As may be appreciated, such default derived message 62 includes requirements 47 that are most-restrictive in nature, such as for example copy never (CN). Thereafter, when the receiver 46 is in fact in possession of the information 49 from the newly tuned stream 32, the receiver 46 then constructs and sends an actual derived message 62. As may be appreciated here, such actual derived message 62 includes requirements 47 that are in fact based on such possessed information 49, and that are meant to replace the requirements 47 from the corresponding default derived message 62.

Figure 8:
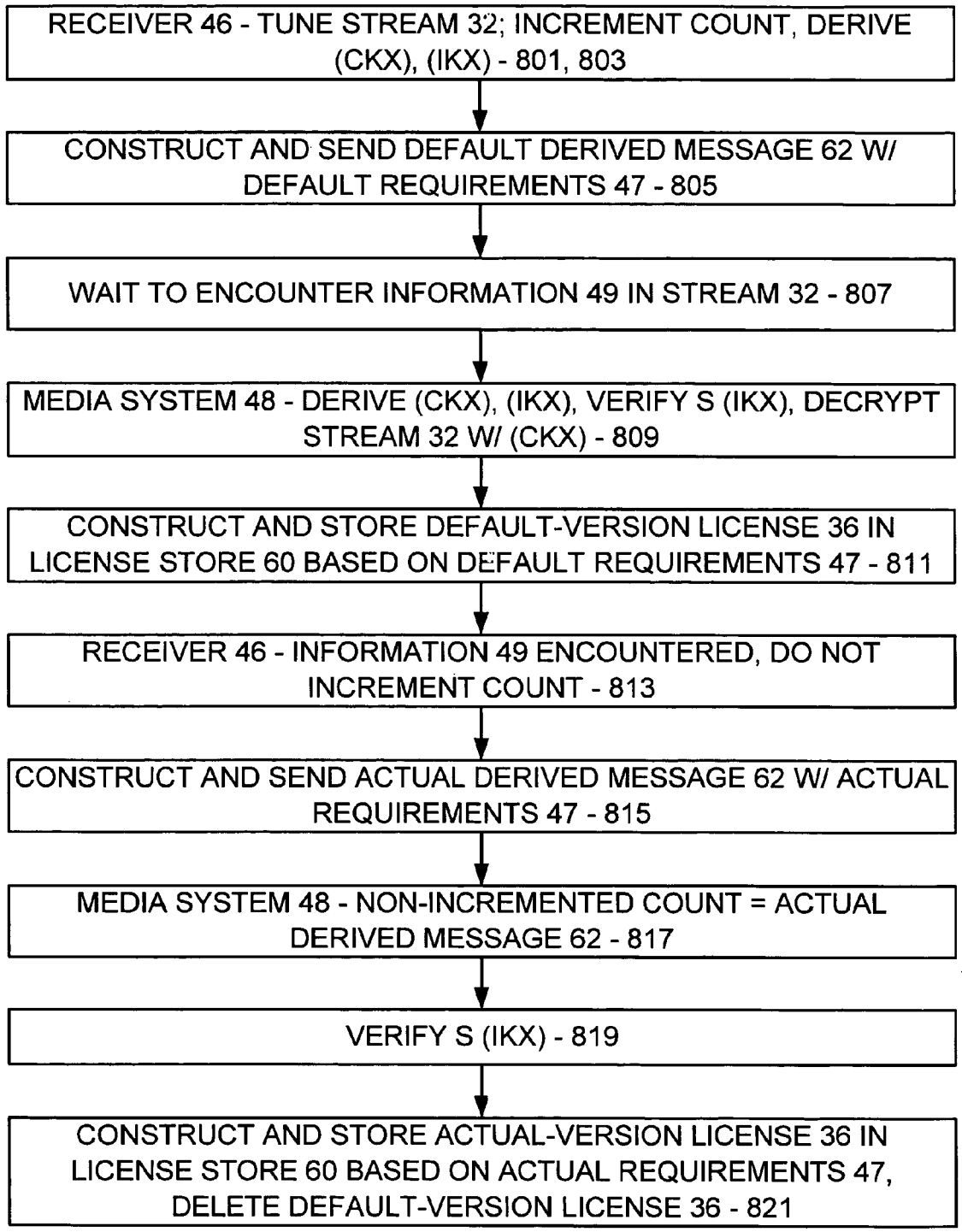

In particular, and turning now to FIG. 8, upon tuning a newly commanded stream 32 (step 801), the receiver 46 increments the count and derives a (CKx) and (IKx) for the stream as at steps 709-713 (step 803). However, presuming that the aforementioned information 49 pertaining to the requirements 47 has not as yet been encountered in the newly tuned stream 32 in a timely manner, the receiver 46 constructs and sends a default derived message 62 that includes default requirements 47 that are most-restrictive in nature, such as for example copy never (CN) (step 805). Thereafter, the receiver 46 waits until the information 49 from the newly tuned stream 32 is in fact encountered (step 807), where such waiting can last as long as 20 seconds or even a manner of minutes in certain circumstances.

Upon in fact encountering the information 49 in the stream 32, the receiver 46 then constructs and sends an actual derived message 62 that includes actual requirements 47 that are in fact based on such encountered information 49 (step 815), such actual requirements 47 in the actual derived message 62 are meant to replace the default requirements 47 from the corresponding default derived message 62. Significantly, and in one embodiment of the present invention, the receiver 46 in constructing and sending the actual derived message 62 as at step 815 does not increment the count (step 813), and thus the default derived message 62 and the corresponding actual derived message 62 have the same count noted therein.

As may now be appreciated, upon receiving the default derived message 62, and as before, the media system 48 derives the corresponding content key (CKx) and integrity key (IKx) as at steps 721 and 723 of FIG. 7, employs such integrity key (IKx) to verify the signature of such default derived message 62 as at step 725, and with the content key (CKx) the media system 48 can decrypt the stream 32 as at step 727 (step 809). Significantly, inasmuch as such default derived message 62 has the default requirements 47 that are most-restrictive in nature, the media system also constructs and stores a default-version license 36 in a license store 60 as at steps 617 and 619 of FIG. 6 that is based on such default requirements 47 and that as a result is highly restrictive in a significant respect (step 811).

However, upon later receiving the actual derived message 62, and in particular upon noting that the count value in such actual derived message 62 has not changed from the count value of the default derived message 62, the media system 48 in one embodiment of the present invention understands the unchanged count value to mean that the actual derived message 62 includes actual requirements 47 that are to replace the default requirements 47 from the default derived message 62 (step 817). Alternatively, the media system 48 may note from copy default field in the requirements 47 in the default derived message 62 that such message 62 is in fact default in nature, and then await the corresponding actual derived message 62.

Accordingly, the media system 48 need not derive the corresponding content key (CKx) and integrity key (IKx) as at steps 721 and 723 of FIG. 7, although such media system 48 does employ the integrity key (IKx) as derived in connection with the default derived message 62 to verify the signature of the actual derived message 62 as at step 725, and employs the content key (CKx) as derived in connection with the default derived message 62 to continue to decrypt the stream 32 as at step 727 (step 819). Significantly, inasmuch as the actual derived message 62 has the actual requirements 47 that could be less-restrictive in nature, the media system 48 also constructs and stores an actual-version license 36 in a license store 60 as at steps 617 and 619 of FIG. 6 that is based on such actual requirements 47 and that is to replace the corresponding default-version license 36 based on the default requirements 47 (step 821).

Note that for the amount of time that the stream 32 can be rendered according to the default-version license 36 based on the default requirements 47, a user likely cannot do anything with such stream 32 in the nature of copying and the like. However, inasmuch as the corresponding actual derived message 62 should be received by the media system 48 at most about 20 seconds to a few minutes after the default derived message 62, and at such time the actual-version license 36 based on the actual requirements 47 would replace the default-version license 36 based on the default requirements 47, the time frame where such stream 32 is so restrictively controlled is relatively small to the point of being insignificant.

At any rate, by providing the default derived message 62 to the media system 48 prior to locating actual requirements 47 from which an actual derived message 62 may be provided, the receiver 46 at least allows the media system 48 to render the corresponding stream 32 in an expeditious manner so that the user of such media system 48 can experience the rendered stream 32 promptly and without an undesirable amount of delay. When the actual derived message 62 is eventually provided to the media system 48, such media system can then construct the corresponding actual-version license 36 based on the actual requirements 47 and can replace the default-version license 36 based on the default requirements 47 without any real loss.

Temporary License Store 60

In a typical RM architecture, a license 36 created for and corresponding to a piece of content 32 should be available for as long as the content 32 is available. Thus, if the content 32 is for example a document that is expected to be present for ten years, then the corresponding license 36 should also be present in a license store 60 for the same ten years. Correspondingly, if the content 32 is for example an ephemeral signal such as a stream 32 that is expected to be present for a very short period of time, then the corresponding license 36 should also be present in a license store 60 for the same very short period of time, ideally.

Thus, in the scenario of FIG. 4 where a receiver 46 can be expected to tune many streams 32, perhaps as fast as once every second or so, it is to be appreciated that the corresponding licenses 36 as stored by the media system 48 in a license store 60 are for the most part barely used and once used are never to be used again. Moreover, the shear volume of such licenses 36 as stored by the media system 48 in a license store 60 can quickly approach huge quantities. Further, by storing so many licenses 36 in such a license store 60, searching for and finding those few licenses 36 that are indeed needed for a relatively long period of time can be cumbersome and slow.

Thus, in one embodiment of the present invention, licenses 36 as stored by the media system 60 are segregated according to relatively short lived licenses 36 and relatively long lived licenses 36. Moreover, in such embodiment, relatively short lived licenses 36 are stored in a more temporary and volatile license store 60 of the media system 48 and relatively long lived licenses 36 are stored in a more permanent and non-volatile license store 60 of the media system 48. For example, the temporary license store 60 may be located in RAM memory of the media system 48, while the permanent license store 60 may be located in a fixed drive memory of the media system 48, although other types of such memory may be employed without departing from the spirit and scope of the present invention.

In one embodiment of the present invention, the media system 48 places licenses 36 in the permanent license store 60 that correspond to long-lived streams 32 that a user or the like has directed to be saved to the storage device 50 for later playback or copying to another media system 48 or the like. Thus, all other licenses 36, which presumably would be for short-lived, more ephemeral streams 32, would be placed by the media system 48 into the temporary license store 60. As may be appreciated, when the permanent license store 60 is non-volatile, the licenses 36 therein are not deleted whenever the media system 48 is turned off or reset, and accordingly can be employed to render the corresponding long-lived streams 32 on an indefinite basis. Note though that licenses 36 can and should be deleted from the permanent license store 60 when no longer needed.

When the temporary license store 60 is volatile, however, the licenses 36 therein are deleted whenever the media system 48 is turned off or reset. However, such a deletion is by implication, and it is to be appreciated that a more explicit method of deletion is also necessary in the event that the media system 48 runs for a relatively long period of time, during which such temporary license store can become filled and/or clogged.

Thus, in one embodiment of the present invention, the media system 48 explicitly commands a deletion of a license 36 in the temporary license store 60 at certain times when such media system 48 deems that such license 36 is no longer needed. Such certain times may be any appropriate times without departing from the spirit and scope of the present invention. For example, it may be the case that the media system 48 commands deleting a license 36 when the corresponding stream 32 is no longer tuned by the receiver 46, such as for example when the receiver 46 is commanded by the media system 48 to tune another stream 32.

However, it is to be appreciated that in fact deleting such a license 36 so quickly may be premature. For example, it may be that information in such to-be-deleted license 36 is still needed, or that the stream 32 corresponding thereto may be re-tuned in a short period of time. Likewise, it may be the case that although one process of the media system 48 no longer requires a license 36 and has commanded a deletion of such license 36, another process may still require same.

Figure 9:
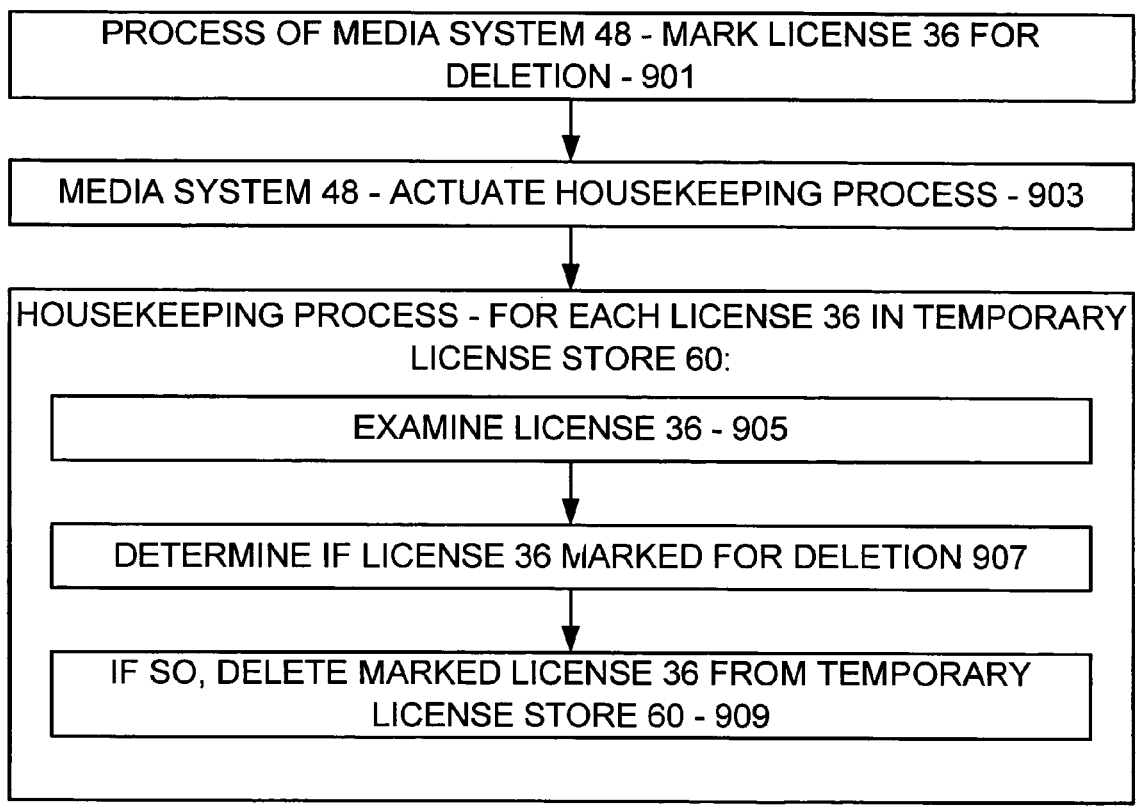

Accordingly, in one embodiment of the present invention, and turning now to FIG. 9, any process of the media system 48 that wishes to delete a license 36 from the temporary license store 60 does so not by in fact deleting same but instead by marking such license 36 with an appropriate mark such as a flag or the like (step 901). As may be appreciated, such flag may be represented by a bit reserved in the license 36 for such use and appropriately set, may be a similar bit in a reference table maintained by the temporary license store 60, or the like. Thus, as marked, such license 36 is not immediately deleted and can be employed by any other process of the media system 48 requiring same.

At a later time after the license 36 has in fact been marked for deletion, then, and presumably well after any other process of the media system could require use of such marked license 36, the media system 48 in fact deletes such marked license 36 by way of actuating a housekeeping process or the like (step 903). In particular, and as may be appreciated, such a housekeeping process of the media system 48 would be periodically actuated thereby to examine each license 36 in the temporary license store 60 (step 905), determine if the license 36 is in fact marked for deletion (step 907), and if so in fact delete such marked license 36 from the temporary license store 60 (step 909).

With the present invention, then, licenses 36 that are not needed for a relatively long period of time are segregated from other licenses 36 by being stored in a temporary license store 60 that is volatile in nature. Moreover, to prevent the temporary license store 60 from becoming congested with too many such licenses 36, such licenses 36 are marked for deletion when no longer needed, and a housekeeping process periodically in fact deletes such marked licenses 36 from the temporary license store 60.

Conclusion

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a system and method are provided for the receiver 46 to create a shortened version of requirements 47 that are to be employed to construct a license 36 such that the receiver 46 need not go to the burden of in fact completely creating such new license 36 every time such receiver 46 newly tunes a stream 32. The shortened version of such requirements 47 can be quickly created and sent to the media system 48 each time the receiver 46 newly tunes a stream 32, even if the user is commanding a change on the order of once every second or so. Additionally, the shortened version of such requirements 47 is concise and yet describes all license requirements for the tuned stream 32 in a minimal amount of space. The format of such requirements 47 can be employed in connection with streams 32 as provided to the media system 48 from sources other than the receiver 46.

Also in the present invention, a system and method are provided for sharing each new content key (CK) between the receiver 46 and the media system 48 without the need for creating an actual license 36 with each such content key (CK) therein. The receiver 46 and media system 48 exchange an initial content key (CK0) and then rotate content keys (CKx) based on the initial content key (CK0) in a coordinated fashion.

Moreover, in the present invention, a system and method are provided for the receiver 46 to send a default set of requirements 47 on a preliminary basis, and then an actual set of requirements 47 when actually located. Such default requirements 47 are employed by the media system 48 until the actual requirements 47 are sent, and the media system 48 can distinguish between such default requirements 47 and such corresponding actual requirements 47 and can replace the default requirements 47 with the corresponding actual requirements 47 upon receipt thereof.

Finally, in the present invention, a system and method are provided for the media system 48 to store at least some licenses 36 corresponding to tuned streams 32 only on a temporary basis. The media system 48 can recognize which licenses 36 need only be stored on a temporary basis, and the media system deletes such temporarily stored licenses when no longer needed.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A method for communicating rules and requirements for a digital license of corresponding digital content from a receiver including a tuner to a computing device programmed to render the digital content, the rules and requirements specifying whether a user of the corresponding digital content has rights to render the corresponding digital content based on any of several factors, the method comprising:

the receiver receiving, from a distributor, a combined signal comprising multiple streams of digital content wherein each of the multiple streams includes digital content and information including a shortened version of rules and requirements for a digital license governing use of the digital content in the respective stream;

the receiver tuning the corresponding digital content from the combined signal;

the receiver locating within each stream the information including the shortened version of the rules and requirements for the digital license governing the use of the corresponding digital content;

the receiver constructing the rules and requirements from the located information and sending such constructed requirements to the computing device; and the computing device receiving the constructed requirements, constructing the digital license based on such received rules and requirements, storing such constructed digital license in a license store of such computing device, and thereafter rendering the corresponding digital content only in accordance with the digital license.

2. The method of claim 1 further comprising:

the receiver receiving the corresponding digital content form from a content distributor, wherein the digital content includes a decryption key (KD) that is encrypted using a public key of the receiver (PU-C);

the receiver decrypting the corresponding digital content using a private key (PR-C) by which PU-C(KD) may be decrypted; and the receiver re-encrypting the decrypted corresponding digital content (CONTENT) using the decryption key (KD) obtained in the decrypting step.

3. The method of claim 1 wherein the information including the shortened version of the rules and requirements for the digital license of corresponding digital content of each stream is supplied within each stream at periodic time intervals.

4. The method of claim 1 wherein the receiver constructs each of one or more rules and requirements for the digital license from the located information according to a same format expected by the computing device.

5. The method of claim 4 wherein the receiver constructs the rules and requirements from the located information according to a format comprising a multi-bit representation divided into a number of pre-defined fields including:

an input copy protection method field specifying a value that corresponds in a predetermined manner to a particular content protection method employed on the content;

a copy control value field representing how the content may be sub-licensed from the computing device to another computing device; and one or more copy protection method-specific fields containing information unique to one or more specific copy protection methods.

6. The method of claim 1 wherein the receiver constructs the rules and requirements from the located information to include whether the computing device can issue a sub-license to another computing device to render the corresponding digital content thereon, and if so how many times the computing device can issue such a sub-license.

7. The method of claim 1 wherein the receiver sends the constructed rules and requirements to a trusted component of the computing device.

8. The method of claim 1 wherein the computing device constructs the digital license based on the received rules and requirements by mapping each field of the rules and requirements to the digital license according to pre-defined mapping rules.

9. A computer-readable storage medium including hardware having stored thereon computer-executable instructions that when processed by a processor implement a method for communicating rules and requirements for a digital license of corresponding digital content from a receiver to a computing device that renders the digital content in accordance with constructed rules and requirements for the digital license received from the receiver, the rules and requirements specifying whether a user of the corresponding digital content has rights to render the corresponding digital content based on any of several factors, the method comprising:

the receiver receiving, from a distributor, a combined signal comprising multiple streams of digital content wherein each of the multiple streams includes digital content and information including a shortened version of rules and requirements for a digital license governing use of the digital content in the respective stream;

the receiver tuning the corresponding digital content from the combined signal;

the receiver locating within each stream the information including the shortened version of the rules and requirements for the digital license governing use of the corresponding digital content; and the receiver constructing the rules and requirements from the located information and sending such constructed requirements to the computing device.

10. The medium of claim 9 wherein the method further comprises:

the receiver receiving the corresponding digital content from a content distributor, wherein the digital content includes a decryption key (KD) that is encrypted using a public key of the receiver (PU-C);

the receiver decrypting the corresponding digital content using a private key (PR-C) by which PU-C(KD) may be decrypted; and the receiver re-encrypting the decrypted corresponding digital content (CONTENT) using the decryption key (KD) obtained in the decrypting step.

11. The medium of claim 9 wherein the information including the shortened version of the rules and requirements for the digital license of corresponding digital content of each stream is supplied within each stream at periodic time intervals and the step of locating within each stream information including the shortened version of relating to the rules and requirements for the digital license comprises checking said stream at said periodic time intervals.

12. The medium of claim 9 wherein the constructing step comprises the receiver constructing each of one or more rules and requirements for the digital license from the located information according to a same format expected by the computing device.

13. The medium of claim 12 wherein the constructing step comprises the receiver constructing the rules and requirements from the located information according to a format comprising a multi-bit representation divided into a number of pre-defined fields including:

an input copy protection method field specifying a value that corresponds in a predetermined manner to a particular content protection method employed on the content;

a copy control value field representing how the content may be sub-licensed from the computing device to another computing device; and one or more copy protection method-specific fields containing information unique to one or more specific copy protection methods.

14. The medium of claim 9 wherein the constructing step comprises the receiver constructing the rules and requirements from the located information to include whether the computing device can issue a sub-license to another computing device to render the corresponding digital content thereon, and if so how many times the computing device can issue such a sub-license.

15. The medium of claim 9 wherein sending the constructed rules and requirements to the computing device comprises the receiver sending the constructed requirements to a trusted component of the computing device.

16. A system comprising:

a computing device including a display device that is programmed to render digital content in accordance with a corresponding digital license, wherein the digital content is extracted from a combined signal comprising a plurality of streams of digital content wherein each stream includes digital content and corresponding information including a shortened version of rules and requirements for a digital license governing use of the digital content in the respective stream; and a receiver including a processor that executes computer-executable instructions to implement a method for:

receiving, from a distributor, the combined signal;

tuning the corresponding digital content from the combined signal;

locating within each stream the information including the shortened version of the rules and requirements for the digital license governing the use of the corresponding digital content;

constructing the rules and requirements from the located information; and sending such constructed rules and requirements to the computing device, wherein the computing device constructs the digital license based on the constructed rules and requirements received from the receiver, stores the constructed digital license in a license store, and thereafter renders the digital content on the display device only in accordance with the digital license.

17. The system of claim 16 wherein the receiver receives the digital content from a content distributor in an encrypted form, wherein the digital content includes a decryption key (KD) that is encrypted using a public key of the receiver (PU-C), decrypts the digital content using a private key (PR-C) by which PU-C(KD) may be decrypted, and re-encrypts the decrypted digital content (CONTENT) using the decryption key (KD) obtained by decrypting the digital content.

18. The system of claim 16 wherein the information including the shortened version of the requirements for the digital license of corresponding digital content of each stream is supplied within each stream at periodic time intervals.

19. The system of claim 16 wherein the receiver constructs each of one or more requirements corresponding to each of the plurality of streams of digital content from the located information according to a same format expected by the computing device.

20. The system of claim 16 wherein the receiver sends the constructed requirements to a trusted component of the computing device.

21. The system of claim 16 wherein the computing device constructs the digital license based on the received requirements by mapping each field of the requirements to the digital license according to pre-defined mapping rules.

* * * * *